United States Patent
Hikosaka et al.

[11] Patent Number: 5,852,898
[45] Date of Patent: Dec. 29, 1998

[54] WEATHER STRIP FOR MOTOR VEHICLE

[75] Inventors: Atsushi Hikosaka, Nagoya; Masahiro Nozaki, Tsushima, both of Japan

[73] Assignee: Toyoda Gosei Co., Ltd., Aichi-ken, Japan

[21] Appl. No.: 818,661

[22] Filed: Mar. 14, 1997

Related U.S. Application Data

[63] Continuation of Ser. No. 430,618, Apr. 28, 1995, abandoned.

[30] Foreign Application Priority Data

| Apr. 28, 1994 | [JP] | Japan | 6-114519 |
| Jun. 3, 1994 | [JP] | Japan | 6-145367 |
| Jan. 17, 1995 | [JP] | Japan | 7-022166 |

[51] Int. Cl.[6] ..................................................... E06B 7/22
[52] U.S. Cl. ........................................ 49/498.1; 49/490.1
[58] Field of Search ............................... 49/475.1, 498.1, 49/493.1, 490.1; 428/40, 354, 214, 317.3

[56] References Cited

U.S. PATENT DOCUMENTS

| 3,600,858 | 8/1971 | Savell ..................................... 49/475.1 |
| 3,775,907 | 12/1973 | Weaver et al. . |
| 4,266,824 | 5/1981 | Inamoto ................................. 49/490.1 |
| 5,050,349 | 9/1991 | Groto et al. ............................ 49/498.1 |
| 5,073,422 | 12/1991 | Konno et al. .............................. 428/40 |
| 5,356,194 | 10/1994 | Takeuchi ................................ 49/475.1 |
| 5,361,542 | 11/1994 | Dettloff ................................... 49/475.1 |
| 5,367,830 | 11/1994 | Omura et al. .......................... 49/475.1 |
| 5,369,914 | 12/1994 | Takeuchi ................................ 49/475.1 |
| 5,372,865 | 12/1994 | Arakawa et al. .......................... 428/40 |

FOREIGN PATENT DOCUMENTS

| 0239115 | 9/1987 | European Pat. Off. . |
| 3836687 | 5/1990 | Germany . |
| 40 41 175 | 7/1992 | Germany . |
| 1-112110 | 7/1989 | Japan . |
| 05 213 119 A | 8/1993 | Japan . |
| 1484962 | 9/1977 | United Kingdom . |
| 2 036 840 | 7/1980 | United Kingdom . |
| 2036840 | 7/1980 | United Kingdom . |

*Primary Examiner*—Daniel P. Stodola
*Assistant Examiner*—Curtis Cohen
*Attorney, Agent, or Firm*—Pillsbury Madison & Sutro LLP Intellectual Property Group

[57] ABSTRACT

An extruded weather strip having a tubular configuration and adapted to be bonded to a body wall along a roof side of a vehicle body, which defines a door opening thereof, with a double-sided adhesive tape. The weather strip includes a bottom portion adapted to be bonded to the body wall with the double-sided adhesive tape, and a seal wall including sides that are connected to both side ends of the bottom portion. The weather strip further includes first and second internal bridge members which interconnect the bottom portion and the seal wall. One end of the first bridge is connected to the seal wall at a position inside of where a door window pane will push on that seal wall while the other end is connected to an outer side end of the bottom portion. One end of the second bridge is connected to the seal wall in a position similar to the first bridge while the other end is connected to an inner side end of the bottom portion.

3 Claims, 3 Drawing Sheets

WEATHER STRIP FOR MOTOR VEHICLE

This is a continuation of application Ser. No. 08/430,618, filed on Apr. 28, 1995, which was abandoned upon the filing hereof.

BACKGROUND OF THE INVENTION

1. Field of the Invention

The present invention relates to weather strips for motor vehicles and, more particularly, to weather strips to be attached along the side of a roof around door openings.

2. Description of Related Art

As shown in FIG. 1, a weather strip 30 is attached to a body wall 11 along an edge of a roof 10 of a vehicle body, which defines a door opening thereof. When a vehicle door is closed, the weather strip 30 is pushed by an upper edge of a door window pane 14.

Weather strips generally have tubular configurations and conventionally have been attached by fitting them into retainers secured to body walls defining door openings. In order to simplify the attaching process, a technique, as shown in FIG. 7, has been frequently adopted. A weather strip 30A is attached by bonding a bottom portion 31 to the body wall 11 with a double-sided adhesive tape 70 without using retainers.

To attach the weather strip 30A, the bottom portion 31 is pressed from the side of the seal wall 34 against the body wall 11 via the double-sided adhesive tape 70.

With this arrangement, however, if a sufficient pressing force is not exerted on the bottom portion 31, the double-sided adhesive tape 70, especially an outer side edge thereof, is likely to peel off from the body wall 11 for the following reason. When a door is closed hard, as shown in FIG. 7, the window pane 14 shifts in the direction of the arrow, and this pulls an outer side wall 32 inwards which applies force to an outer side end of the bottom portion 31 in a direction that will separate it from the body wall 11.

In order to overcome this problem, in Japanese Utility Model application laid-open No. Hei 1-112110, as shown in FIG. 7, by forming outer and inner side walls 32 and 34 of solid rubber, similarly to the bottom portion 31, the pressing force to be exerted on both side edges of the double-sided adhesive tape 70 is enlarged, and accordingly, the adhesive strength thereof is increased.

In this arrangement, however, when the bottom portion 31 is pressed from the side of the seal wall 34 by hand or by a pressing roller, there is the possibility that the pressing force is exerted on the bottom portion 31 via the side walls 32 and 33 obliquely, with respect to the bottom portion 31, causing one of side ends of the bottom portion 31 not to be bonded sufficiently.

Furthermore, in cases where the side walls 32 and 33 are not perpendicular but positioned obliquely with respect to the bottom portion 31, the possibility exists that the side walls 32 and 33 will not exert sufficient pressing force on the bottom portion 31, even if they are formed of solid rubber.

SUMMARY OF THE INVENTION

Accordingly, it is an object of the present invention to provide an approach for a tubular weather strip which exerts stable and sufficient pressing force on a double-sided adhesive tape for attaching the weather strip along the bottom side of a roof of a vehicle, thereby exhibiting excellent adhesive and sealing properties.

It is another object of the present invention to provide a weather strip bonding which reduces pulling force to be exerted on an outer side end of a bottom portion upon the closing of a vehicle door, thereby preventing the bottom portion from peeling away from the vehicle body.

The weather strip of the present invention has a tubular configuration, a bottom portion thereof is bonded to a body wall that defines a door opening with double-sided adhesive tape, and a seal wall thereof is connected to an inner side end and an outer side end of the bottom portion, respectively, to define a tubular portion.

The weather strip includes a bridge for interconnecting the bottom portion and the seal wall across the tubular portion. The bridge includes one bridge member having spaced apart ends, one end being connected to the seal wall at a position inside a point where a door window pane pushes on the seal wall and another end being connected to the outer side end of the bottom portion.

In a preferred embodiment, the bridge further includes another bridge member, one end of which is connected to the seal wall adjacent the one bridge member and another end of which is connected to the inner side end of the bottom portion.

Furthermore, in the weather strip of the present invention, an outer side of the seal wall is connected to the bottom portion at a position spaced inwardly of an outer side edge of the double sided adhesive tape bonded to the bottom portion, namely, adjacent the widthwise center of the bottom portion.

With the present invention, when the seal wall is pressed toward the body wall during attachment, the pressing force is exerted on the outer side edge or both side edges of the double-sided adhesive tape via the bridge, whereby adhesive strength of the outer side edge or both side edges of the double-sided adhesive tape is increased.

In addition, by connecting the outer side of the seal wall to the bottom portion positioned inside the outer side edges of the double-sided adhesive tape, pulling forces created by door closure exerted by the door window pane on the outer side end of the bottom portion via the outer side wall can be reduced, whereby the outer side edge of the double-sided adhesive tape is prevented from peeling away from the body wall.

Other objects, features and characteristics of the present invention will become apparent upon consideration of the following description and the appended claims with reference to the accompanying drawings, all of which form a part of this specification.

DETAILED DESCRIPTION OF THE PRESENTLY PREFERRED EXEMPLARY EMBODIMENTS

Figure 1:
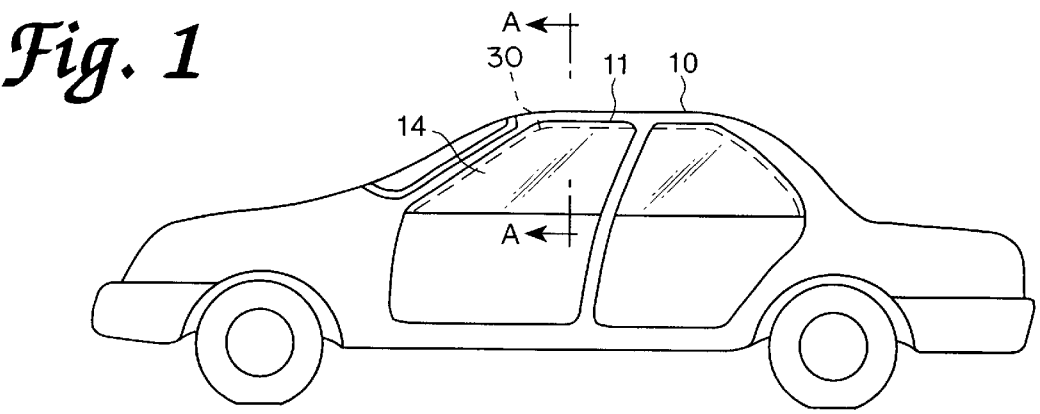
FIG. 1 is a side elevational view of a motor vehicle to which the present invention is applied.
Figure 2:
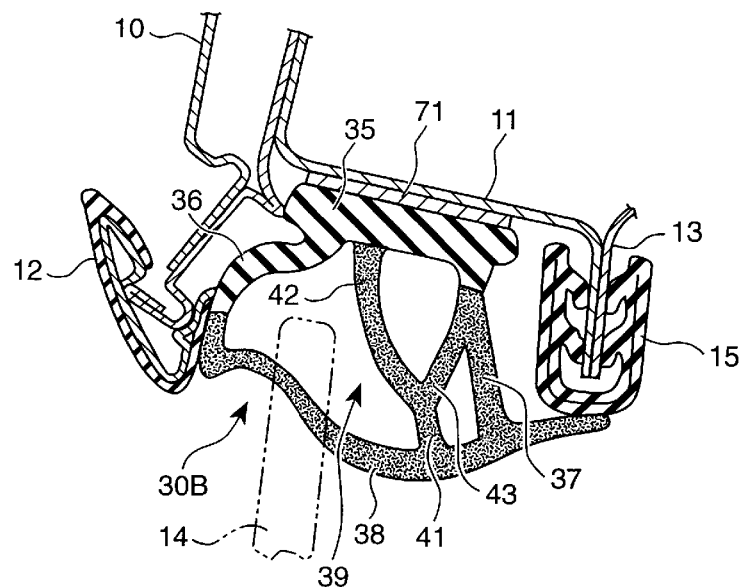
FIG. 2 is a cross-sectional view of a first embodiment of the present invention, taken along the line A—A of FIG. 1.

FIG. 2 illustrates a first embodiment of the present invention, weather strip 30B in the form of a tubular extruded body having a sector-like cross-section composed of a bottom portion 35, an outer side wall 36, an inner side wall 37 and a seal wall 38. Bottom portion 35 is relatively thick and formed of solid rubber. The outer side wall 36 extends obliquely outwardly from an outer side end of the bottom portion 35 and is also formed of solid rubber except for its lower portion which is formed of sponge rubber. An inner side wall 37 extends obliquely inwardly from an inner side end of the bottom portion 35 and is formed of sponge rubber except for its upper portion which is formed of solid rubber. Lower ends of both side walls 35 and 37 are connected by the sponge rubber seal wall 38 which has an outwardly curved configuration.

Bottom portion 35 is connected to the seal wall 38 by a bridge, generally indicated at 39, formed of sponge rubber, and which extends across the interior of the tubular weather strip 30B. The bridge 39 has a generally Y-shaped cross-section, and is composed of a base portion 41, a first bridge 42 and a second bridge 43. The base portion 41 protrudes generally upright from the seal wall 38 and is positioned inside the point where a door window pane 14 pushes upon seal wall 38. The first and second bridges 42 and 43, respectively, diverge upwardly from the base portion 41. The first bridge 42 is connected to the bottom portion 35 slightly inside the upper end of the outer side wall 36, while the second bridge 43 is connected to the upper part of the inner side wall 37.

In the thus-constructed weather strip 30B, nearly the entire surface of the bottom portion 35 is bonded to body wall 11 along a roof side rail 10 with a strip-shaped double-sided adhesive tape 71. In the drawing, reference numeral 12 denotes a roof side molding, and 15 denotes an opening trim attached to a flange 13 of the body wall 11.

To attach the weather strip 30B, the double-sided adhesive tape 71 is first bonded to the surface of the bottom portion 35. Then, the weather strip 30B is pressed from the outside of the seal wall 38 against the body wall 11. At this time, the open leg-shaped bridges 42 and 43 extend in the undeformed state between the seal wall 38 and the bottom portion 35 to exert a pressing force on both side ends of the bottom portion 35.

The pressing force from the seal wall 38 is also exerted on the outer end of the bottom portion 35 via the outer side wall 36. This pressing force, however, is insufficient in transmission efficiency thereof because the outer side wall 36 extends obliquely with respect to the exerting direction of the pressing force. With the present embodiment, by virtue of the exertion of the pressing force via the first bridge 42, necessary bonding force is ensured in the outer side end of the bottom portion 35.

In the inner side end of the bottom portion 35, sufficient bonding force is also ensured because pressing force developed via the second bridge 43 is added to that coming via the inner side wall 37. Thus, with this arrangement, uniform and sufficient pressing force is exerted on and around both side edges of the double-sided adhesive tape 71. These are the two areas where peeling of the double-sided adhesive tape 71 is likely to occur. By firmly pressing the double-sided adhesive tape 71 in these areas, tape 71 will be prevented from peeling off from the body wall 11.

The first bridge 42 extends obliquely across the interior of the tubular weather strip 30B so as to support the seal wall 38 which is pushed up by the door window pane 14 upon closing of the vehicle door. Accordingly, the first bridge 42 enables the close contact between the door window pane 14 and the seal wall 38 to improve the sealing properties therebetween. In the case where that the door window pane 14 deviates inwards due to variations in the assembled position thereof, the first bridge 42 exerts reaction force on the door window pane 14 to push it toward the predetermined assembling position.

Figure 3:
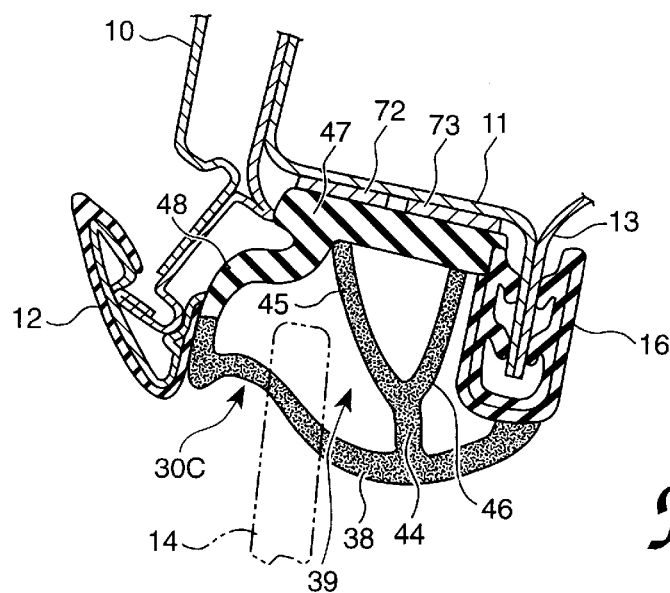
FIG. 3 is a cross-sectional view of a second embodiment of the present invention, also taken along a line A—A of FIG. 1.

FIG. 3 illustrates a second embodiment of the present invention. An opening trim 16 is formed integrally with a modified extended weather strip 30C, and serves as an inner side wall thereof. A bridge member having a generally Y-shaped cross-section is formed across the tubular weather strip 30C and includes first bridge 45 and a second bridge 46 which diverge from a common base portion 44. The first bridge 45 is connected to an outer part of the bottom portion 47 near an upper end of an outer side wall 48, and the second bridge 46 is connected to an inner part of the bottom portion 47 near an upper end of the opening trim 16. The bottom portion 47 is bonded to a body wall 11 with parallel outer and inner double sided adhesive tapes 72 and 73, respectively. The remainder of the structure of the second embodiment is substantially identical to that of the first embodiment.

With the second embodiment, both the outer side wall 48 and the first bridge 45 exert pressing force on the double-sided adhesive tape 72, and both the opening trim 16 and the second bridge 46 exert pressing force on the double-sided adhesive tape 73, whereby sufficient adhesive strength of both the tapes 72 and 73 is ensured. Furthermore, by virtue of the first bridge 45, good sealing properties between the door window pane 14 and the seal wall 38 can be ensured.

Figure 4:
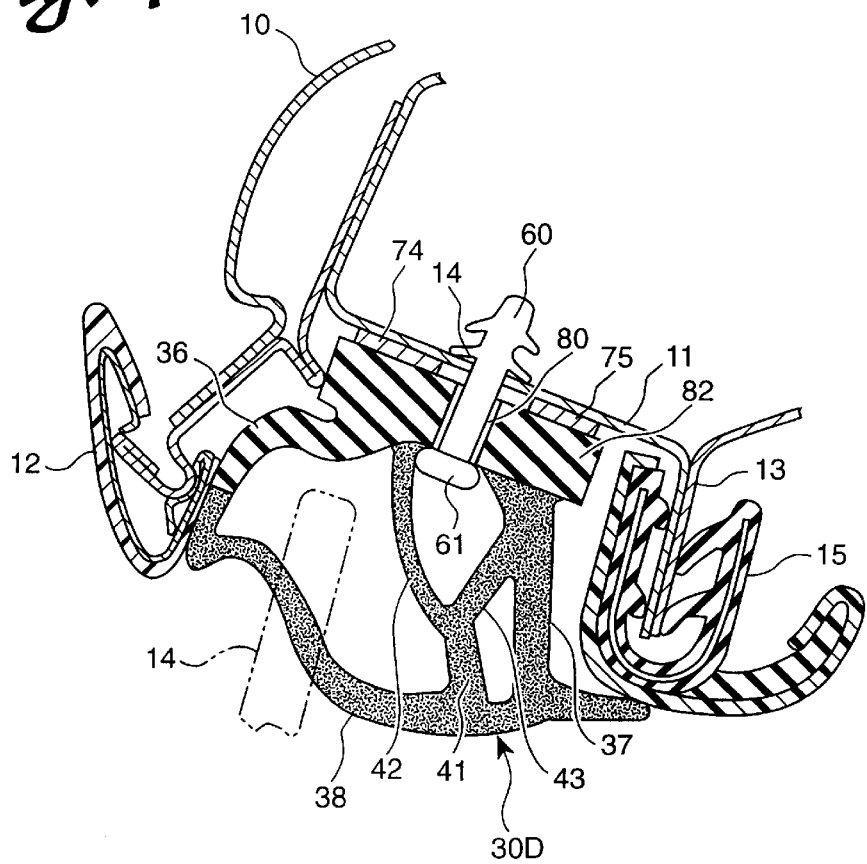
FIG. 4 is a cross-sectional view of a third embodiment of the present invention, also taken along a line A—A of FIG. 1.

FIG. 4 illustrates a third embodiment of the present invention. A plurality of spaced apart clip holes 80 are formed about the widthwise center of a bottom portion 82 of an extruded weather strip 30D at predetermined intervals in the longitudinal direction of the bottom portion 82. The remainder of the structure of the weather strip 30D is substantially identical to that of the weather strip 3B of the first embodiment (FIG. 2). In FIG. 4, parts similar to those in FIG. 2 are given the same reference numeral as in FIG. 2.

To attach the weather strip 30D, double-sided adhesive tapes 74 and 75 are first bonded to a surface of the bottom portion 82 in the longitudinal direction thereof on both sides of the clip holes 80, and heads 61 of clips 60 are respectively inserted into the clip holes 80 and then clips 60 are press-fitted into clip holes 14 formed in a body wall 11, respectively, thereby positioning the weather strip 30D on the body wall 11. Next, the bottom portion 82 is bonded to the body wall 11 with the double-sided adhesive tapes 74 and 75, thereby attaching the weather strip 30D thereto.

It is preferable to form the outer double-sided adhesive tape 74 softer and thicker (as shown in an unpressed state by the dotted line in FIG. 4), as compared with the inner double-sided adhesive tape 75. With this arrangement, the outer double-sided adhesive tape 74 can be pressed firm against the body wall 11 to come into close contact therewith in conformity with irregularities such as joints thereof, thereby exhibiting good sealing properties. The inner double-sided adhesive tape 75 which is harder than the outer double-sided adhesive tape 74 ensures good stability in the attachment of the weather strip 30D to the body wall 11. For example, the outer double-sided adhesive tape 74 is formed of a soft material compressible by 25% in thickness under a load of 0.1 to 0.5 $kg/cm^2$, and the inner double-sided adhesive tape 75 is formed of a relatively hard material compressible by 25% in thickness under a load of 0.8 to 2.0 $kg/cm^2$.

Where clip heads project inwardly from the bottom portion of the weather strip, due to variations in the attached position of the door window pane and due to strong closing of the vehicle door, the seal wall is likely to be pushed up excessively by the window pane and be pressed against the hard clip heads. If the seal wall is repeatedly pressed against the hard clip heads, there is a possibility that the seal wall will be damaged. With the present embodiment, by virtue of the first bridge 42 which is interposed between the clip heads 61 and the seal wall 38, the seal wall 38 is not pressed against the clip heads 61 directly, even when the seal wall 38 is pushed up by the window pane 14 excessively. Consequently, the seal wall 38 is prevented from being damaged due to rubbing of the seal wall 38 directly against the clip heads 61.

Figure 5:
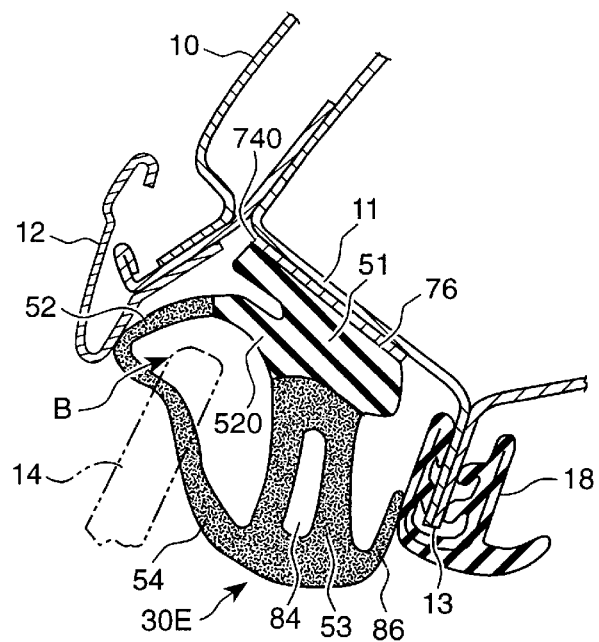
FIG. 5 is a cross-sectional view of a fourth embodiment of the present invention, also taken along a line A—A of FIG. 1.

FIG. 5 illustrates a fourth embodiment of the present invention. As shown, a weather strip 30E is formed with a tubular body formed integrally by extrusion, which is composed of a bottom portion 51, an outer side wall 52, an inner side wall 53 and a seal wall 54.

The bottom portion 51 is thick and formed of solid rubber. The inner side wall 53 of sponge rubber is connected to an inner side end of the bottom portion 51. The inner side wall 53 also includes an inner cavity 84. An upper end portion 520 of the outer side wall 52 is connected to the bottom portion 51 slightly outwardly of the widthwise center thereof, and extends outwardly along the bottom portion 51. A lower portion of the outer side wall 52 has an outwardly expanding arc-shaped cross-section. The upper end portion 520 is made of solid rubber, while the lower portion of the outer side wall 52 is made of sponge rubber. Lower ends of the side walls 52 and 53 are connected by the seal wall 54 of sponge rubber.

The bottom portion 51 of the thus-constructed weather strip 30E is bonded to body wall 11, which extends along a roof side rail 10, with a double-sided adhesive tape 75 over its entire width. A roof side molding 12 is attached along the roof side rail 10 so as to cover the weather strip 30E. An opening trim 18 is attached to a flange 13 protruding from an inner edge of the body wall 11. The opening trim 18 contacts a lip 86 projecting from the lower end of the inner side wall 53 of the weather strip 30E.

Upon closing of a vehicle door, the door window pane 14 pushes the seal wall 54 of the weather strip 30E in the direction indicated by B to overstroke obliquely inwards temporarily, and then returns to a predetermined closed position thereof. When the vehicle door is closed strongly, the above overstroke of the door window pane 14 becomes large enough to pull the outer side wall 52 inwards together with the seal wall 54. This creates a pulling force on the bottom portion 51 from the upper end portion 520 of the outer side wall 52. With the present embodiment, since the upper end portion 520 is connected at about the widthwise center of the bottom portion 51, which is positioned inside the outer side edge 740 of the double-sided adhesive tape 75, the outer side end of the bottom portion 51 is prevented from separating from the body wall 11 because the force is not applied at that outer end but more centrally along the bottom portion 51. Accordingly, the outer side edge 740 of the double-sided adhesive tape 75 is prevented from peeling away from the body wall 11 even if the vehicle door is closed strongly.

Since the upper end portion 520 extends outwardly along the bottom portion 51, effect of any such pulling force on the bottom portion 51 will also be further reduced.

Figure 6:
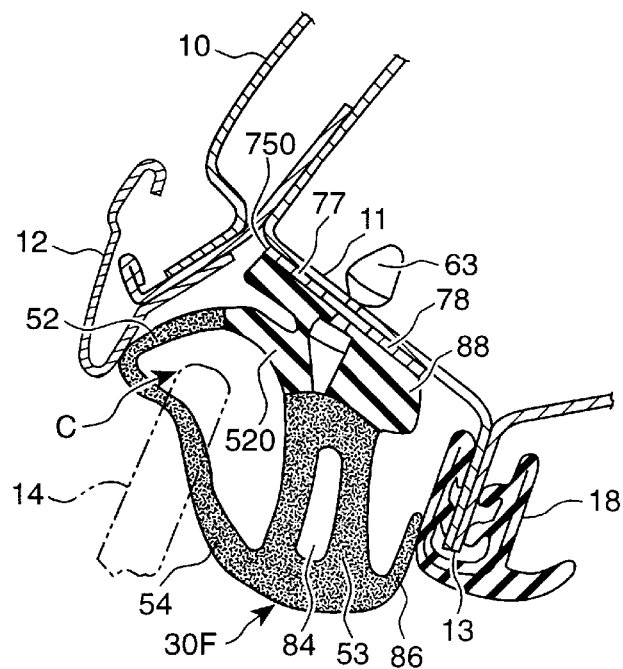
FIG. 6 is a cross-sectional view of a fifth embodiment of the present invention, also taken along a line A—A of FIG. 1.
Figure 7:
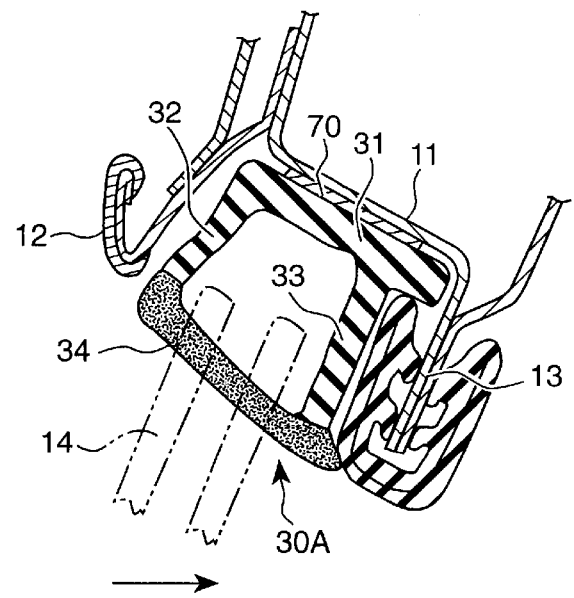
FIG. 7 is a cross-sectional view of a conventional weather strip, taken along a line A—A of FIG. 1.

FIG. 6 illustrates a fifth embodiment of the present invention. As shown, an outer part and an inner part of a bottom portion 88 of a weather strip 30F are respectively bonded to a body wall 11 with double-sided adhesive tapes 77 and 78, and the bottom portion 88 is secured to the body wall 11 along the widthwise center thereof by clips 63. An upper end portion 520 of an outer side wall 52 is connected to the bottom portion 88 close to the clip securing positions thereof. The remainder of the structure of the present embodiment is substantially identical to that of the fourth embodiment. In FIG. 6, parts similar to those in FIG. 5 are given the same reference numeral as in FIG. 5.

With the present embodiment, the outer double-sided adhesive tape 77 can be prevented from peeling away from the body wall 11 further, as compared with the fourth embodiment.

In the weather strip in accordance with the present invention, when the bottom portion thereof is bonded to the body wall with the double-sided adhesive tape, pressing forces applied during attachment and use, exerted on the bottom portion, are applied to the bottom portion and especially to the outer and inner side edges thereof. This increases the adhesive strength of both side edges of the double-sided adhesive tape, wherein peeling of the double-sided adhesive tape would otherwise be likely to occur.

Furthermore, with the weather strip in accordance with the present invention, the action point of the pulling force exerted on the bottom portion via the outer side wall upon closing of the vehicle door can be shifted toward the widthwise center of the bottom portion so that peeling of the outer side edge of the double-sided adhesive tape can be prevented.

While the invention has been described in connection with what are considered presently to be the most practical and preferred embodiments, it is to be understood that the invention is not limited to the disclosed embodiments but, on the contrary, is intended to cover various modifications and equivalent arrangements included within the spirit and scope of the appended claims.

What is claimed is:

1. A weather strip having a tubular configuration and adapted to be bonded by double-sided adhesive tape to a body wall which defines a door opening, comprising:

a bottom portion having an inner side end and an outer side end, said bottom portion having a generally flat board-like configuration and adapted to be bonded to said body wall with said double-sided adhesive tape;

a seal wall including inner and outer sides connected to said inner side end and said outer side end, respectively, to define a tubular portion; and a bridge for interconnecting said bottom portion and said seal wall across said tubular portion, said bridge having a Y-shaped cross-section, and one end of said bridge being connected to said seal wall at a position inside a point where a door window pane is adapted to push on said seal wall, and two diverging ends of said bridge being connected to said outer side end and said inner side end of said bottom portion, respectively, and said one end of said bridge extending approximately perpendicular from the seal wall.

2. A weather strip as in claim 1 wherein said bottom portion further includes a plurality of clip holes spaced apart along the widthwise center thereof, said bottom portion being adapted to be positioned on said body wall with clips which are fitted into said clip holes, and bonded to said body wall with separate double-sided adhesive tapes located on opposite sides of said clip holes.

3. A weather strip as in claim 2 wherein an outer adhesive tape of said separate double-sided adhesive tapes is thicker than and formed of a material softer than an inner adhesive tape of said separate double-sided adhesive tapes.

* * * * *